US011874622B2

(12) United States Patent
Morita

(10) Patent No.: US 11,874,622 B2
(45) Date of Patent: Jan. 16, 2024

(54) SHEET TRANSPORT DEVICE, IMAGE READING DEVICE, AND IMAGE FORMING APPARATUS

(71) Applicant: FUJIFILM Business Innovation Corp., Tokyo (JP)

(72) Inventor: Miho Morita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 593 days.

(21) Appl. No.: 16/538,846

(22) Filed: Aug. 13, 2019

(65) Prior Publication Data

US 2020/0301343 A1    Sep. 24, 2020

(30) Foreign Application Priority Data

Mar. 18, 2019 (JP) ................................ 2019-049726

(51) Int. Cl.
*B65H 1/14* (2006.01)
*B65H 1/08* (2006.01)
(Continued)

(52) U.S. Cl.
CPC ............. *G03G 15/703* (2013.01); *B65H 1/18* (2013.01); *B65H 11/02* (2013.01); *G03G 2215/00729* (2013.01)

(58) Field of Classification Search
CPC . B65H 1/14; B65H 1/18; B65H 11/02; B65H 2405/11161; B65H 2511/414;
(Continued)

(56) References Cited

U.S. PATENT DOCUMENTS 6,485,015 B2 * 11/2002 Yen .......................... B65H 1/12 271/127
6,896,257 B2 5/2005 Yamashita et al.
(Continued)

FOREIGN PATENT DOCUMENTS

JP 02225222 A * 9/1990
JP H0977272 3/1997
(Continued)

OTHER PUBLICATIONS

"Notice of Reasons for Refusal of Japan Counterpart Application", dated Dec. 27, 2022, with English translation thereof, p. 1-p. 6.
(Continued)

*Primary Examiner* — Luis A Gonzalez
(74) *Attorney, Agent, or Firm* — JCIPRNET

(57) ABSTRACT

A sheet transport device includes a sheet load tray on which a sheet is loaded, a detector that detects whether or not the sheet exists on the sheet load tray, a feeder that feeds the sheet one-by-one from the sheet load tray, and a sheet-load-tray ascend-descend unit that moves the sheet in a sheet loading direction to set an uppermost sheet at a sheet feed position of the feeder, and a controller. In a case where the sheet is detected by the detector, the controller causes the sheet load tray to ascend or descend before the feeder starts to feed the sheet so that ascending-descending operation for moving the sheet load tray between the sheet feed position and a descent position located below the sheet feed position is performed at least once.

14 Claims, 11 Drawing Sheets

(51) Int. Cl.

| | |
|---|---|
| ***G03G 15/00*** | (2006.01) |
| ***B65H 11/02*** | (2006.01) |
| ***B65H 1/18*** | (2006.01) |

(58) Field of Classification Search

CPC .......... B65H 2511/12; B65H 2511/212; B65H 2511/20; B65H 3/62; B65H 7/02; B65H 9/101; B65H 2405/1412

See application file for complete search history.

(56) References Cited

U.S. PATENT DOCUMENTS

| | | | | |
|---|---|---|---|---|
| 3,056,896 | A1 | 11/2011 | Oshima | |
| 8,743,431 | B2 * | 6/2014 | Hayasaka | B65H 3/0607 399/361 |
| 2003/0085506 | A1 * | 5/2003 | Kubo | B65H 1/14 271/152 |
| 2004/0156662 | A1 * | 8/2004 | Fujii | G03G 15/607 399/367 |
| 2018/0097961 | A1 * | 4/2018 | Morita | H04N 1/00615 |
| 2019/0291981 | A1 * | 9/2019 | Yoshita | B65H 3/62 |
| 2020/0307930 | A1 * | 10/2020 | Okamoto | H04N 1/00602 |

FOREIGN PATENT DOCUMENTS

| | | | |
|---|---|---|---|
| JP | 2002332121 | | 11/2002 |
| JP | 2004-106995 | | 4/2004 |
| JP | 2004238160 | | 8/2004 |
| JP | 2007031069 | A * | 2/2007 |
| JP | 2008094570 | | 4/2008 |
| JP | 2008222430 | | 9/2008 |
| JP | 2010-001091 | | 1/2010 |
| JP | 2010-132396 | | 6/2010 |
| JP | 2014101202 | | 6/2014 |
| JP | 2017210350 | A * | 11/2017 |

OTHER PUBLICATIONS

"Office Action of Japan Counterpart Application", dated May 30, 2023, with English translation thereof, p. 1-p. 3.

* cited by examiner

SHEET TRANSPORT DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2019-049726 filed Mar. 18, 2019.

BACKGROUND

(i) Technical Field

The present disclosure relates to sheet transport devices, image reading devices, and image forming apparatuses.

(ii) Related Art

Japanese Unexamined Patent Application Publication No. 2010-1091 discloses a known sheet feeding device including a vertically ascendable-descendible sheet load plate on which sheets are loaded, a feeder that comes into pressure contact with the upper surface of the sheets loaded on the sheet load plate and moves the pressure-contacted surface in a predetermined direction so as to sequentially feed the sheets, an ascend-descend unit that causes the sheet load plate to ascend and descend, a controller that controls driving of the ascend-descend unit, and an upper-surface detector that detects the upper surface of the sheets loaded on the sheet load plate. When the controller uses the ascend-descend unit to cause the sheet load plate to ascend to a reference feed position, the controller calculates a displacement amount from the reference feed position based on a timing at which the upper-surface detector detects the upper surface of the sheets and a timing at which the ascend-descend unit stops, and causes the sheet load plate to descend by the calculated displacement amount.

Japanese Unexamined Patent Application Publication No. 2004-106995 discloses a known sheet feeding device that includes a sheet feed tray on which sheets are loaded, a sheet feeder that separates the sheets loaded on the sheet feed tray from each other and feeds each sheet, and a registration unit that aligns the leading edges of the sheets fed by the sheet feeder by causing the leading edges of the sheets to abut on the registration unit by a predetermined abutment amount. The sheet feeding device further includes a receiver that receives a mixed mode signal for feeding sheets of various widths loaded on the sheet feed tray, and a controller that controls driving of the sheet feeder when the receiver receives the mixed mode signal, such that the abutment amount of the sheets on the registration unit is larger than the predetermined abutment amount.

SUMMARY

Aspects of non-limiting embodiments of the present disclosure relate to a sheet transport device, an image reading device, and an image forming apparatus that are capable of correcting a skew of a sheet loaded on a load section before the sheet is fed, as compared with a case where ascending-descending operation of the load section is not performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including a sheet load tray on which a sheet is loaded, a detector that detects whether or not the sheet exists on the sheet load tray, a feeder that feeds the sheet one-by-one from the sheet load tray, and a sheet-load-tray ascend-descend unit that moves the sheet in a sheet loading direction to set an uppermost sheet at a sheet feed position of the feeder, and a controller. In a case where the sheet is detected by the detector, the controller causes the sheet load tray to ascend or descend before the feeder starts to feed the sheet so that ascending-descending operation for moving the sheet load tray between the sheet feed position and a descent position located below the sheet feed position is performed at least once.

BRIEF DESCRIPTION OF THE DRAWINGS

Exemplary embodiments of the present disclosure will be described in detail based on the following figures, wherein.

DETAILED DESCRIPTION

The present disclosure will be described in further detail below with reference to exemplary embodiments and specific examples. However, the present disclosure is not to be limited to these exemplary embodiments and specific examples.

Furthermore, in the following description with reference to the drawings, it should be noted that the drawings are schematic and that the dimensional ratios are different from the actual dimensional ratios. For providing an easier understanding, components other than those necessary for the description are omitted, where necessary.

1. Overall Configuration and Operation of Image Forming Apparatus

Figure 1:
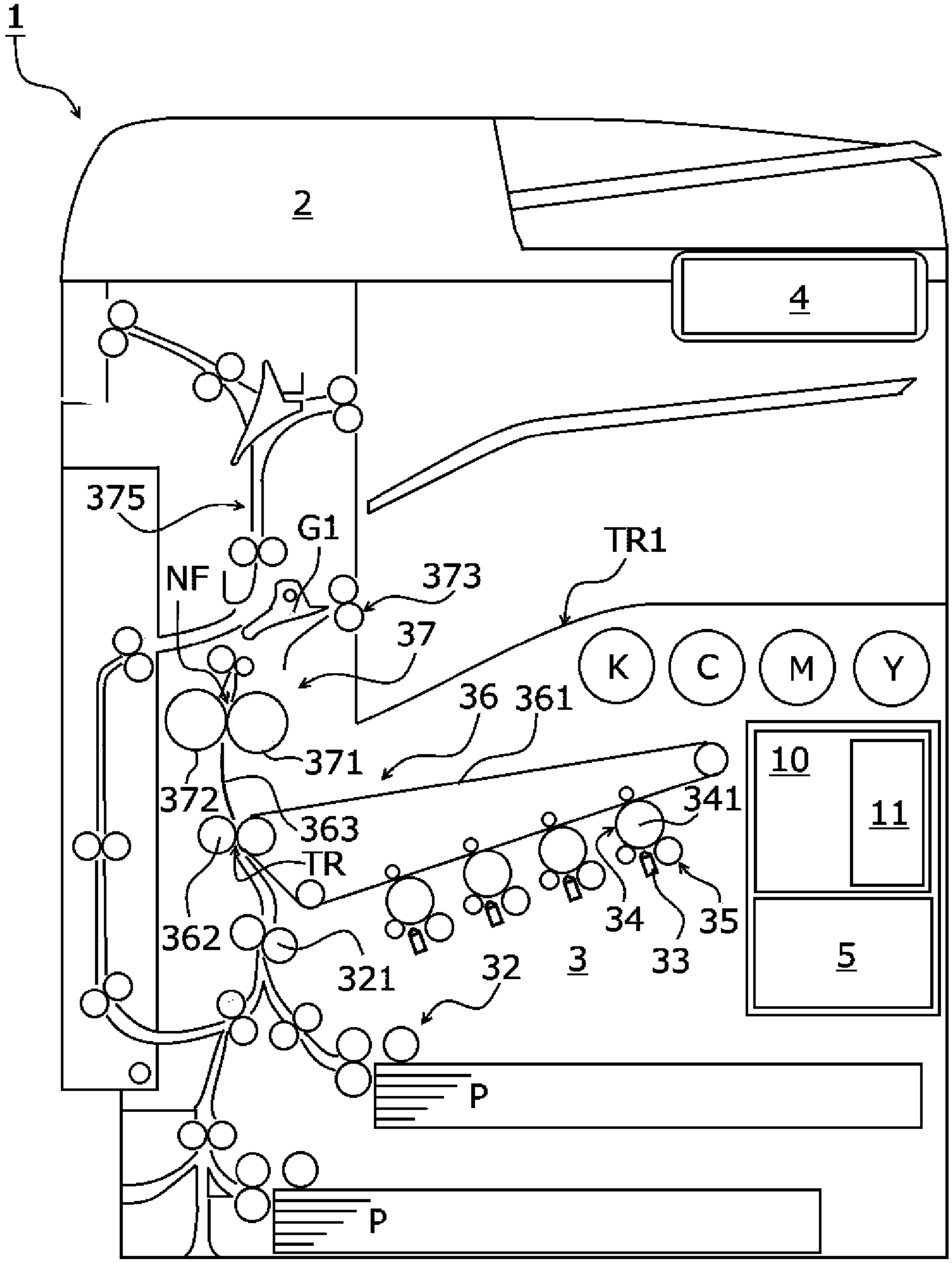
FIG. 1 is a cross-sectional view schematically illustrating the internal configuration of an image forming apparatus.
Figure 2:
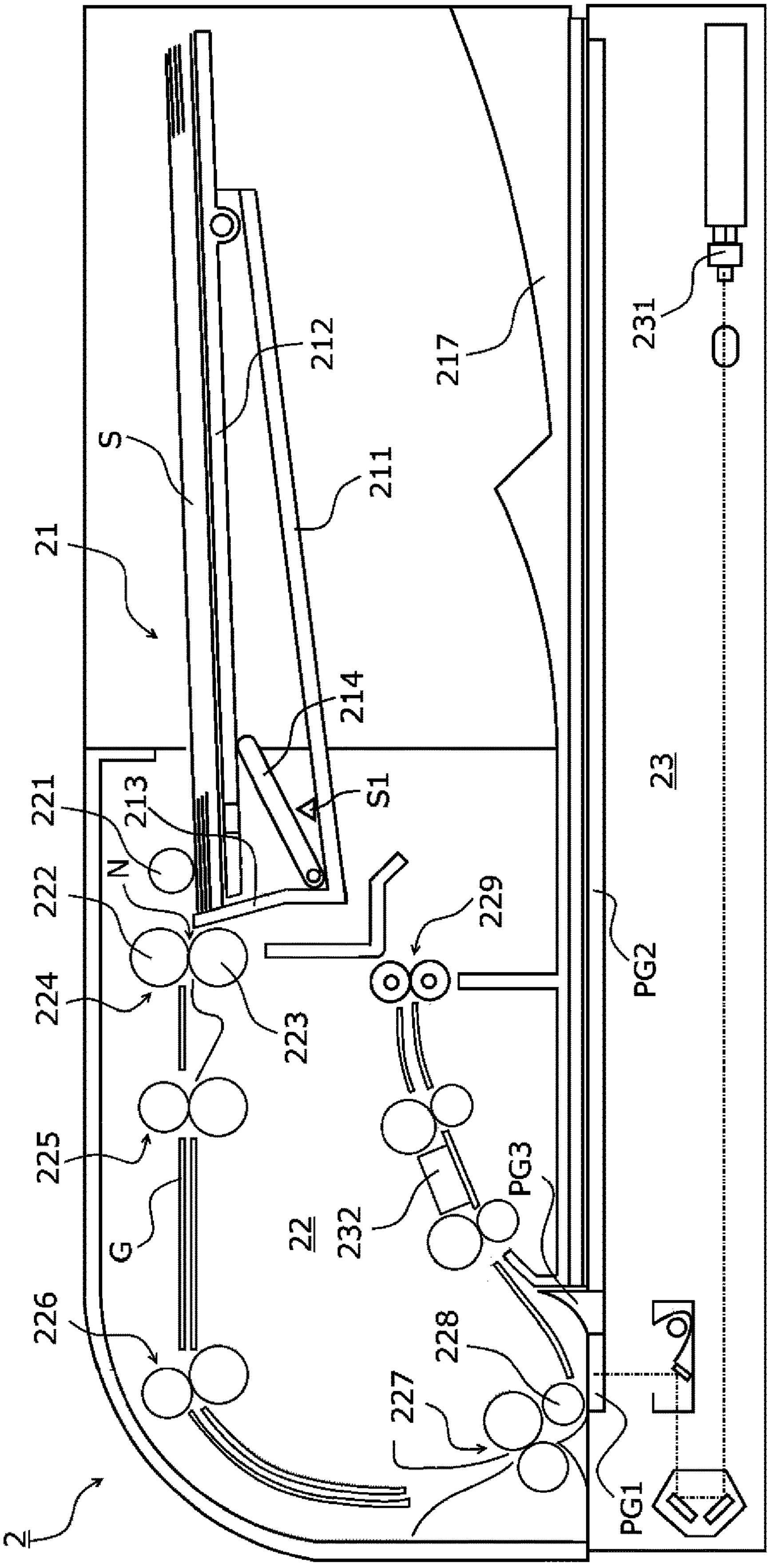
FIG. 2 is a cross-sectional view illustrating the internal configuration of an image reading device.
Figure 3:
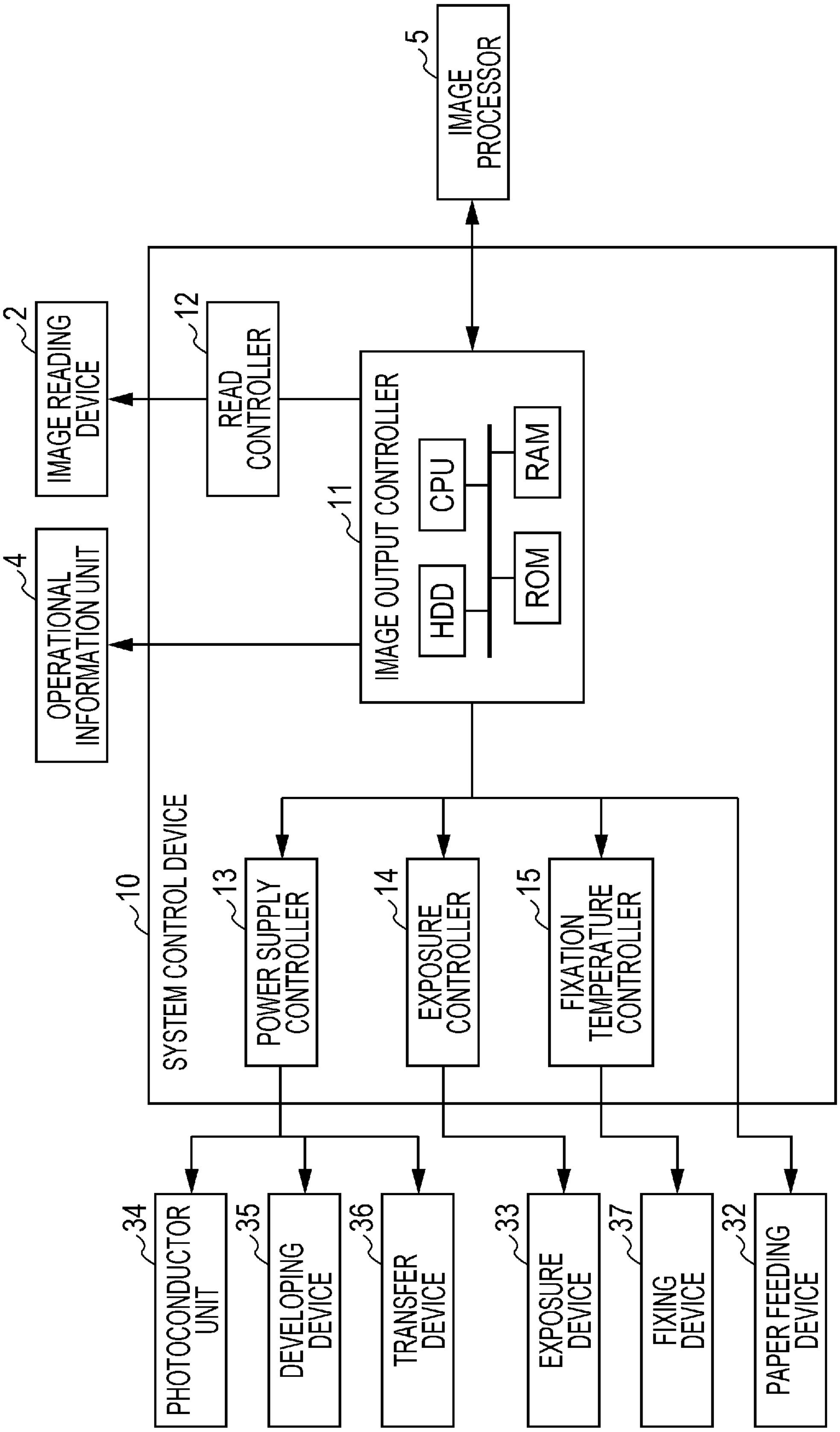
FIG. 3 is a block diagram illustrating an example of a functional configuration of the image forming apparatus.

FIG. 1 is a cross-sectional view schematically illustrating the internal configuration of an image forming apparatus 1 according to an exemplary embodiment. FIG. 2 is a cross-sectional view illustrating the internal configuration of an image reading device 2. FIG. 3 is a block diagram illustrating an example of a functional configuration of the image forming apparatus 1. The overall configuration and the operation of the image forming apparatus 1 will be described below with reference to the drawings.

1.1. Overall Configuration

The image forming apparatus 1 includes an image reading device 2 as a reader that reads an image from a sheet S, such as a document, and converts it into image data, an image forming unit 3 as an image recorder that prints the read image data onto paper as a recording medium, an operational information unit 4 as a user interface, and an image processor 5.

The image reading device 2 includes a sheet load section 21, an automatic sheet feeder 22, and an image reader 23 as an example of an imaging unit. The automatic sheet feeder 22 transports the sheet S placed on the sheet load section 21 to a read position of the image reader 23. An image read by an image sensor (not shown), such as a charge-coupled device (CCD) line sensor, of the image reader 23 is converted into image data as an electric signal.

The image forming unit 3 includes a paper feeding device 32, exposure devices 33, photoconductor units 34, developing devices 35, a transfer device 36, and a fixing device 37, and forms image information received from the image processor 5 as a toner image onto paper P fed from the paper feeding device 32.

The operational information unit 4 as a user interface is disposed on the front surface of the image reading device 2. The operational information unit 4 is constituted of a combination of, for example, a liquid crystal display panel, various control buttons, and a touchscreen. A user of the image forming apparatus 1 may input various settings and a command via the operational information unit 4. Moreover, various types of information are displayed to the user of the image forming apparatus 1 via the liquid crystal display panel.

The image processor 5 generates image data from the image read by the image reading device 2 and from print information transmitted from an external apparatus (such as a personal computer).

1.2. Image Forming Unit

Paper P designated in a print job for each printing process is fed from the paper feeding device 32 to the image forming unit 3 in accordance with an image formation timing of the image forming unit 3.

The photoconductor units 34 individually include photoconductor drums 341 that are provided parallel to one another above the paper feeding device 32 and that are rotationally driven. The developing devices 35 form yellow (Y), magenta (M), cyan (C), and black (K) toner images on the corresponding photoconductor drums 341 having electrostatic latent images formed thereon by the exposure devices 33.

The toner images formed on the photoconductor drums 341 of the respective photoconductor units 34 are sequentially electrostatically transferred (first-transferred) onto an intermediate transfer belt 361 of the transfer device 36, so that a superposed toner image constituted of toners of the respective colors is formed. The superposed toner image on the intermediate transfer belt 361 is collectively transferred by a second-transfer roller 362 onto the paper P transported from a pair of registration rollers 321 and guided by a transport guide.

In the fixing device 37, a fixation nip FN (fixation region) is formed by a pressure contact area of a pair of heating module 371 and pressing module 372.

The paper P having the toner image collectively transferred thereon by the transfer device 36 is transported to the fixation nip FN of the fixing device 37 via a transport guide 363 in a state where the toner image is not fixed on the paper P yet. Then, the pair of heating module 371 and pressing module 372 fixes the toner image onto the paper P in accordance with heating and pressing functions.

The paper P having the fixed toner image formed thereon is guided to a switch gate G1 and is output from a first pair of output rollers 373 so as to be accommodated in a paper output tray TR1 at the upper surface of the image forming apparatus 1. If the paper P is to be inverted for duplex printing or is to be output with the image recorded face thereof facing upward, the transport direction of the paper P is switched toward a transport path 375 by the switch gate G1.

1.3. Image Reading Device

The image reading device 2 includes the sheet load section 21, the automatic sheet feeder 22, and the image reader 23. The sheet load section 21 and the automatic sheet feeder 22 are connected to each other in an openable and closable manner above the image reader 23.

The sheet load section 21 includes an ascendable-descendible plate 212 on which one or more sheets S having images recorded thereon are placed. The ascendable-descendible plate 212 is ascendable and descendible in accordance with the number of loaded sheets S and retains the sheets S at an ascent position where the upper surface of the sheets S is in contact with a nudger roller 221.

The automatic sheet feeder 22 includes the nudger roller 221 that fetches the sheets S loaded on the ascendable-descendible plate 212 sequentially from the top, and also includes a separator 224 constituted of a feed roller 222 and a retardation roller 223 in pressure contact with the feed roller 222.

In the separator 224, the feed roller 222 and the retardation roller 223 form a pair that separates sheets S from each other, if multiple stacked sheets S are fed to a nip N, so as to transport the sheets S one-by-one to the image reader 23.

In a transport path G, a transport roller 225 is disposed at a position downstream of the feed roller 222 in the transport direction of the sheet S. The transport roller 225 transports the sheet S fed by the feed roller 222 to a pre-registration roller 226.

A registration roller 227 that adjusts the transport timing of the sheet S is disposed downstream of the pre-registration roller 226. The pre-registration roller 226 corrects a skew of the sheet S by forming a loop in a state where the leading edge of the sheet S is in abutment with the registration roller 227 in a stopped state. The registration roller 227 is rotationally driven in accordance with a timing for starting a reading process. In a state where the loop of the sheet S is maintained by the transport roller 225 and the pre-registration roller 226, the sheet S is pressed against a sheet passing surface PG1 by a platen roller 228 so that the front face of the sheet S is read by the image reader 23.

A sheet placement surface PG2 that supports a sheet S placed thereon by an operator is disposed to the right of the sheet passing surface PG1. A sheet guide PG3 is disposed between the sheet passing surface PG1 and the sheet placement surface PG2. The sheet S passing over the sheet passing surface PG1 is guided to the sheet guide PG3 so as to be transported to a read sensor 232. The sheet S whose front face is read by the image reader 23 is output by an output roller 229 to an output section 217 provided below the sheet load section 21, while the rear face of the sheet S is read by the read sensor 232.

An image reading sensor 231 that optically reads an image of a sheet S and converts it into an electric signal is provided below the sheet placement surface PG2. Specifically, the image reading sensor 231 reads an image from a sheet S passing over the sheet passing surface PG1 or from a sheet S placed on the sheet placement surface PG2. The read image is converted into image data as an electric signal.

1.4. Block Configuration of Image Forming Apparatus

The image forming apparatus 1 includes a system control device 10 including an image output controller 11, a read controller 12, a power supply controller 13, an exposure controller 14, and a fixation temperature controller 15, and executes a control program stored in a memory to control the operation of the entire image forming apparatus 1.

The image output controller 11 gives operation control commands to, for example, the paper feeding device 32, the exposure devices 33, the photoconductor units 34, the developing devices 35, the transfer device 36, and the fixing device 37 included in the image forming unit 3.

Furthermore, the image output controller 11 gives operation control commands to the power supply controller 13, the exposure controller 14, and the fixation temperature controller 15 included in the system control device 10. Specifically, the image output controller 11 determines whether or not, for example, the paper feeding device 32, the exposure devices 33, the photoconductor units 34, the developing devices 35, the transfer device 36, and the fixing device 37 constituting the image forming unit 3 are to be driven by being supplied with power, and transmits commands to the respective controllers therefor in accordance with the determination results.

Moreover, the image output controller 11 exchanges information with the read controller 12 and performs predetermined image read control if an image read command is received therefrom via the operational information unit 4.

The read controller 12 controls the operation of the image reading device 2 to read an image from each sheet S by scanning while transporting the sheet S loaded on the sheet load section 21 to the image reader 23 via the automatic sheet feeder 22, and receives the read image data. The received image data is accumulated in a storage unit (HDD).

2. Configuration and Operation of Sheet Load Section

Figure 4A:
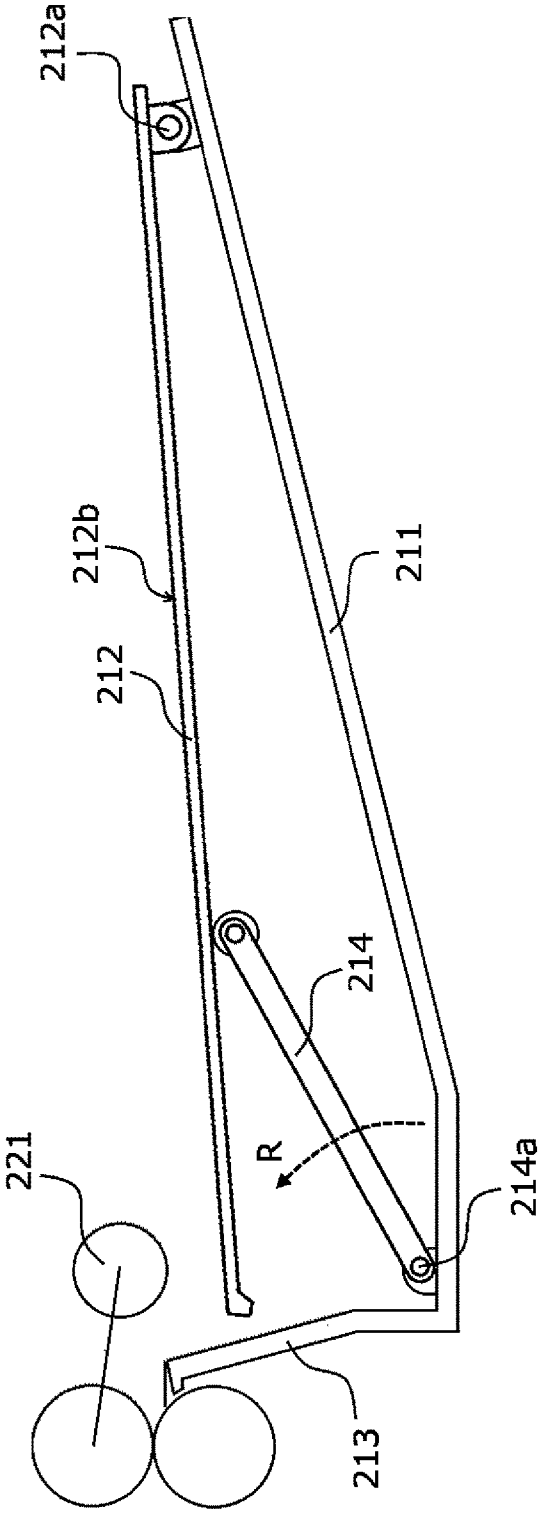
FIGS. 4A and 4B are cross-sectional views schematically illustrating the configuration of a sheet load section, FIG. 4A illustrating a state where an ascendable-descendible plate has ascended to a sheet feed position, FIG. 4B illustrating a state where the ascendable-descendible plate has descended.
Figure 4B:
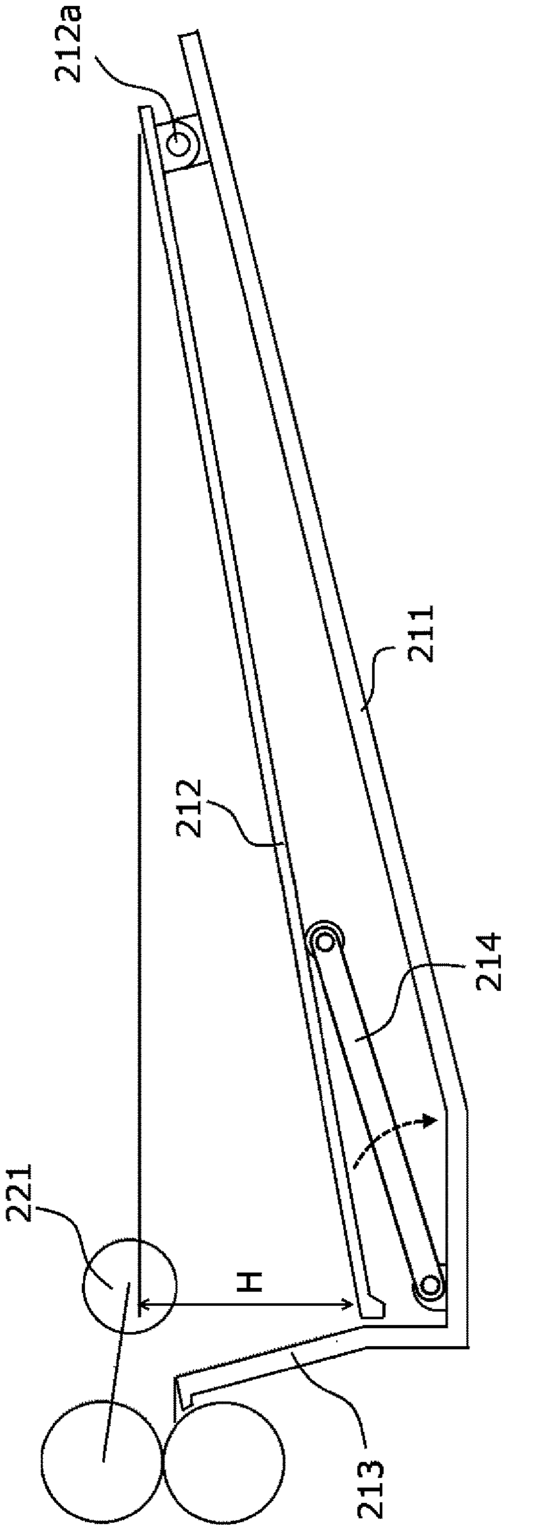
Figure 5:
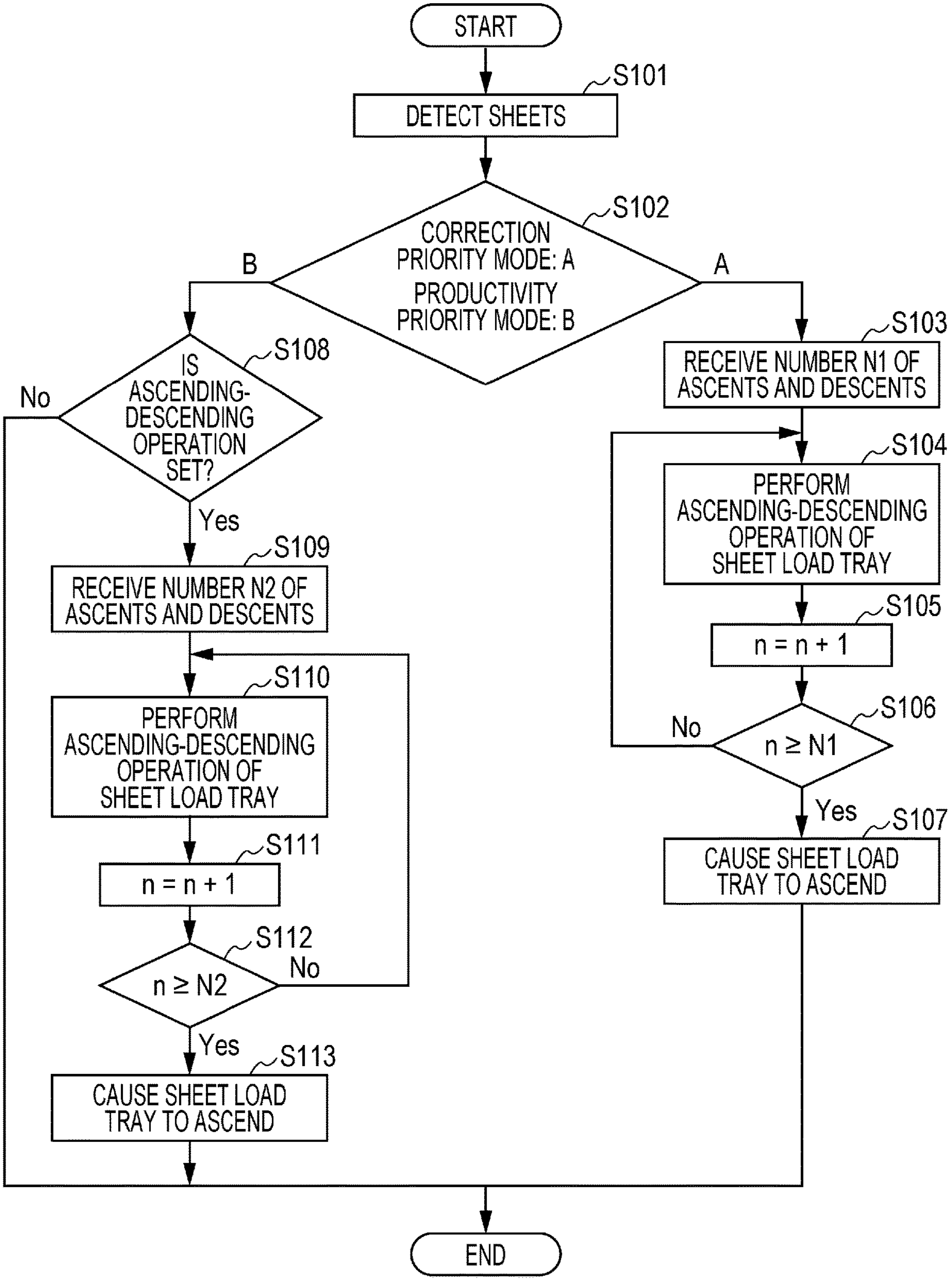
FIG. 5 is a flowchart illustrating the flow of the operation of the sheet load section.
Figure 6A:
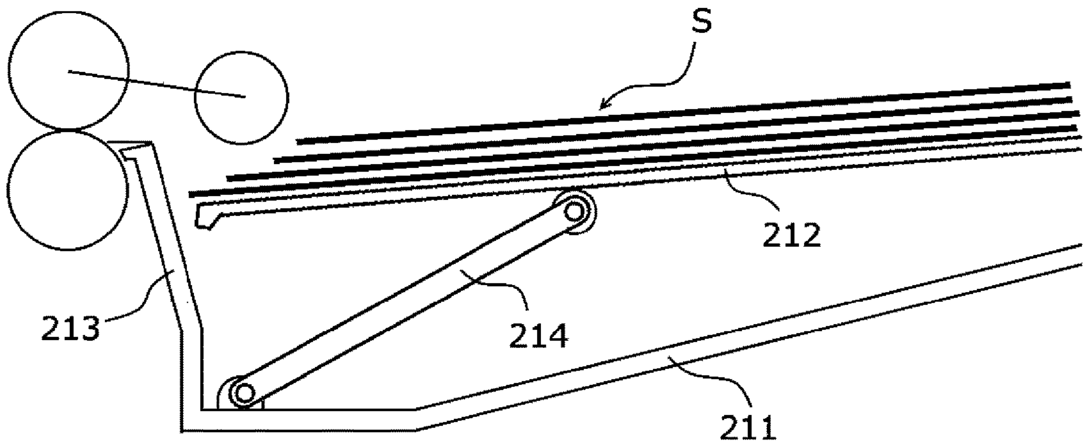
FIGS. 6A to 6C are cross-sectional views schematically illustrating the operation of the ascendable-descendible plate having sheets placed thereon, FIG. 6A illustrating a state where the sheets are placed on the ascendable-descendible plate, FIG. 6B illustrating a state where the ascendable-descendible plate is descending, FIG. 6C illustrating a state where the ascendable-descendible plate has descended and the sheets have been aligned.
Figure 6B:
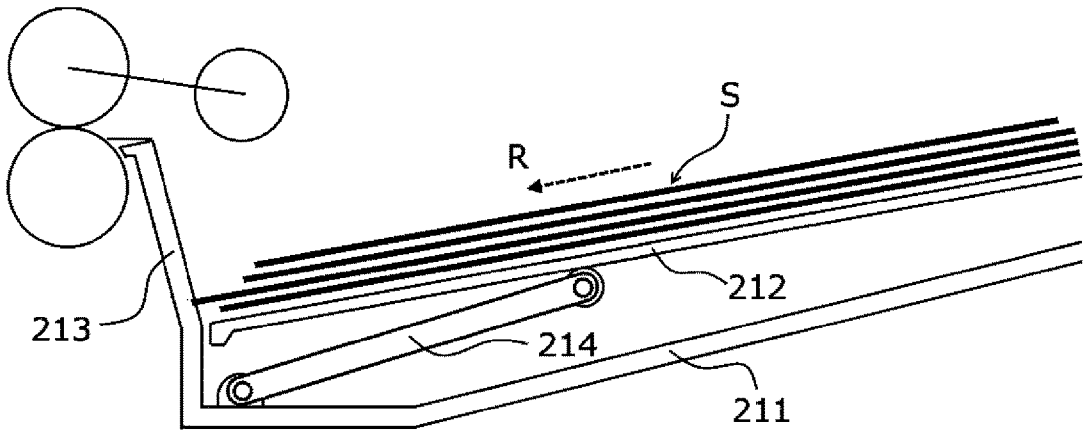
Figure 6C:
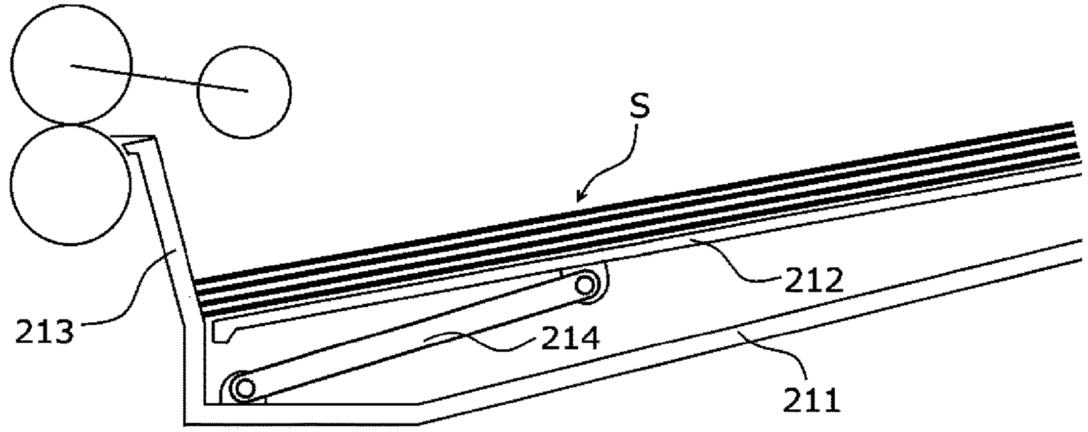

FIGS. 4A and 4B are cross-sectional views schematically illustrating the configuration of the sheet load section 21. Specifically, FIG. 4A is a cross-sectional view illustrating a state where the ascendable-descendible plate 212 has ascended to a sheet feed position, and FIG. 4B is a cross-sectional view illustrating a state where the ascendable-descendible plate 212 has descended. FIG. 5 is a flowchart illustrating the flow of the operation of the sheet load section 21. FIGS. 6A to 6C are cross-sectional views schematically illustrating the operation of the ascendable-descendible plate 212 having sheets S placed thereon. Specifically, FIG. 6A is a cross-sectional view illustrating a state where sheets S are placed on the ascendable-descendible plate 212, FIG. 6B is a cross-sectional view illustrating a state where the ascendable-descendible plate 212 is descending, and FIG. 6C is a cross-sectional view illustrating a state where the ascendable-descendible plate 212 has descended and the sheets S have been aligned. The configuration and the operation of a sheet feeding unit constituted of the sheet load section 21 and the separator 224 will be described below with reference to the drawings.

2.1. Overall Configuration of Sheet Load Section

The sheet load section 21 supports the ascendable-descendible plate 212 as an example of a sheet load tray in an ascendable-descendible manner above a tray body 211, and is capable of holding sheets of various sizes, that is, sheets S with different dimensions with respect to at least one of a sheet length corresponding to a distance in the sheet transport direction and a sheet width corresponding to a distance in the direction intersecting (orthogonal to) the sheet transport direction.

A sheet-edge aligning section 213 is provided at the sheet feed side of the tray body 211. First edges (i.e., the leading edges in the sheet transport direction) of the sheets S loaded on the ascendable-descendible plate 212 come into contact with the sheet-edge aligning section 213 so that the leading edges of the sheets S are aligned.

Side guides 215 (see FIG. 8) are disposed at the opposite edges in the direction intersecting (orthogonal to) the sheet transport direction, such that a center registration method is employed in which the opposite widthwise edges of the sheets S of various sizes are aligned in the width direction with reference to the side guides 215.

The nudger roller 221 is disposed close to the feed roller 222 above the sheet-edge aligning section 213. The nudger roller 221 is maintained at a retreated position during a standby mode by being lifted upward, and descends to a nip position (i.e. sheet feed position) during a sheet feeding mode so as to feed the uppermost sheet S on the ascendable-descendible plate 212.

In FIGS. 4A and 4B, the ascendable-descendible plate 212 is supported above the tray body 211 in a rotatable manner about a rotation axis 212*a*. The upper surface of the ascendable-descendible plate 212 is provided with a load surface 212*b* for the sheets S.

An ascend-descend rod 214 that causes the ascendable-descendible plate 212 to ascend and descend between the sheet feed position and the descent position is in contact with the lower surface near a first end of the ascendable-descendible plate 212 in the sheet feeding direction. The ascend-descend rod 214 is capable of transmitting a driving force from a driving source (not shown), such as a stepping motor, to a rotation axis 214*a*, such that the first end of the ascendable-descendible plate 212 ascends or descends in accordance with rotation of the ascend-descend rod 214 (see an arrow R in FIG. 4A).

FIG. 4A illustrates a state where the ascendable-descendible plate 212 has ascended to the sheet feed position. When the ascendable-descendible plate 212 has ascended, the first edges (i.e. the leading edges in the sheet transport direction) of the sheets S placed on the load surface 212*b* may sometimes be misaligned (see FIG. 6A).

FIG. 4B illustrates a state where the ascendable-descendible plate 212 has descended to the descent position. Because the ascendable-descendible plate 212 descends while rotating about the rotation axis 212*a* provided at an upstream position distant from the first end in the sheet transport direction, the ascendable-descendible plate 212 at the descent position is inclined so as to decrease in height toward the first end in the feeding direction (see reference sign H in FIG. 4B). Accordingly, the first edges (i.e. the leading edges in the sheet transport direction) of the sheets S placed on the load surface 212*b* are readily movable toward the sheet-edge aligning section 213 (see FIG. 6C).

2.2. Operation of Sheet Load Section

When images are to be read from sheets S, the user of the image forming apparatus 1 places the sheets S on the load surface 212*b* of the ascendable-descendible plate 212 and moves the side guides 215 so as to align and set the sheets S in the width direction.

When the sheets S are set on the ascendable-descendible plate 212 of the sheet load section 21 and a sheet detection sensor S1 is turned on in step S101, the read controller 12 determines in step S102 whether the reading mode for the sheets S is a correction priority mode for correcting a skew of the sheets S toward zero or a productivity priority mode for prioritizing productivity by increasing the number of feedable sheets S per unit time. The correction priority mode and the productivity priority mode may be set by the user via the operational information unit 4 when the sheets S are to be read, or may be set in the image forming apparatus 1 in advance.

In a case where the sheets S are detected by the sheet detection sensor S1, the image reading device 2 according to this exemplary embodiment may perform ascending-descending operation for moving the ascendable-descendible plate 212 between the sheet feed position and the descent position at least once before the automatic sheet feeder 22 starts feeding the sheets S, and may correct a skew of the sheets S before the sheets S loaded on the ascendable-descendible plate 212 are fed.

If the reading mode for the sheets S is the correction priority mode (A in step S102), the number N1 of ascents and descents of the ascendable-descendible plate 212 during the feeding of the sheets S is received in step S103. The number N1 of ascents and descents may be set in the image forming apparatus 1 in advance, or may be set by the user via the operational information unit 4.

Then, the ascending-descending operation of the ascendable-descendible plate 212 is performed at least once in step S104 and step S105. As shown in FIG. 6A, in the ascending-descending operation, the ascend-descend rod 214 is rotationally driven so that the ascendable-descendible plate 212 located at the feed position descends to the descent position, and then ascends again to the feed position. In this ascending-descending operation, as the ascendable-descendible plate 212 descends toward the descent position, the ascendable-descendible plate 212 becomes inclined so as to decrease in height toward the feeding direction, as schematically shown in FIGS. 6B and 6C, and the sheets S move toward the sheet-edge aligning section 213 in accordance with an impact caused by the descent toward the descent position.

When the ascending-descending operation reaches the set number N1 of ascents and descents (YES in step S106), the ascendable-descendible plate 212 ascends to the feed position in step S107, so that the skew-corrected sheets S become in a feedable state.

If the reading mode for the sheets S is the productivity priority mode (B in step S102), it is determined whether or not ascending-descending operation is set in step S108. If ascending-descending operation is set (YES in step S108), the number N2 of ascents and descents of the ascendable-descendible plate 212 is received in step S109. Then, the ascending-descending operation of the ascendable-descendible plate 212 is performed at least once in steps S110 and S111. If the ascending-descending operation reaches the set number N2 of ascents and descents (YES in step S112), the ascendable-descendible plate 212 ascends to the feed position in step S113, so that the skew-corrected sheets S become in a feedable state.

FIGS. 6A to 6C schematically illustrate how a skew at the leading edges of the sheets S is corrected in accordance with the ascending-descending operation of the ascendable-descendible plate 212. As shown in FIG. 6A, in a state where the sheets S are placed on the load surface 212*b* of the ascendable-descendible plate 212, the leading edges of the sheets S (in the sheet transport direction) may sometimes be misaligned. In particular, in the image reading device 2 of a so-called free registration type that is capable of identifying which position of the sheet load section 21 sheets S are placed on, the sheets S placed on the ascendable-descendible plate 212 are positionally misaligned in the feeding direction.

When the ascendable-descendible plate 212 descends toward the descent position from this state, the ascendable-descendible plate 212 becomes inclined so as to decrease in height toward the feeding direction, as shown in FIG. 6B. Thus, the sheets S on the load surface 212*b* of the ascendable-descendible plate 212 slide and move toward the sheet-edge aligning section 213 (see an arrow R in FIG. 6B).

Then, as shown in FIG. 6C, when the ascendable-descendible plate 212 descends to the descent position, the ascendable-descendible plate 212 receives an impact caused as it stops at the descent position, so that the sheets S on the load surface 212*b* abut on the sheet-edge aligning section 213, whereby the leading edges of the sheets S become aligned. Consequently, the skew of the sheets S loaded on the sheet load section 21 may be corrected before the sheets S are fed, as compared with a configuration where ascending-descending operation of the ascendable-descendible plate 212 as a sheet load tray is not performed.

First Modification

Figure 7A:
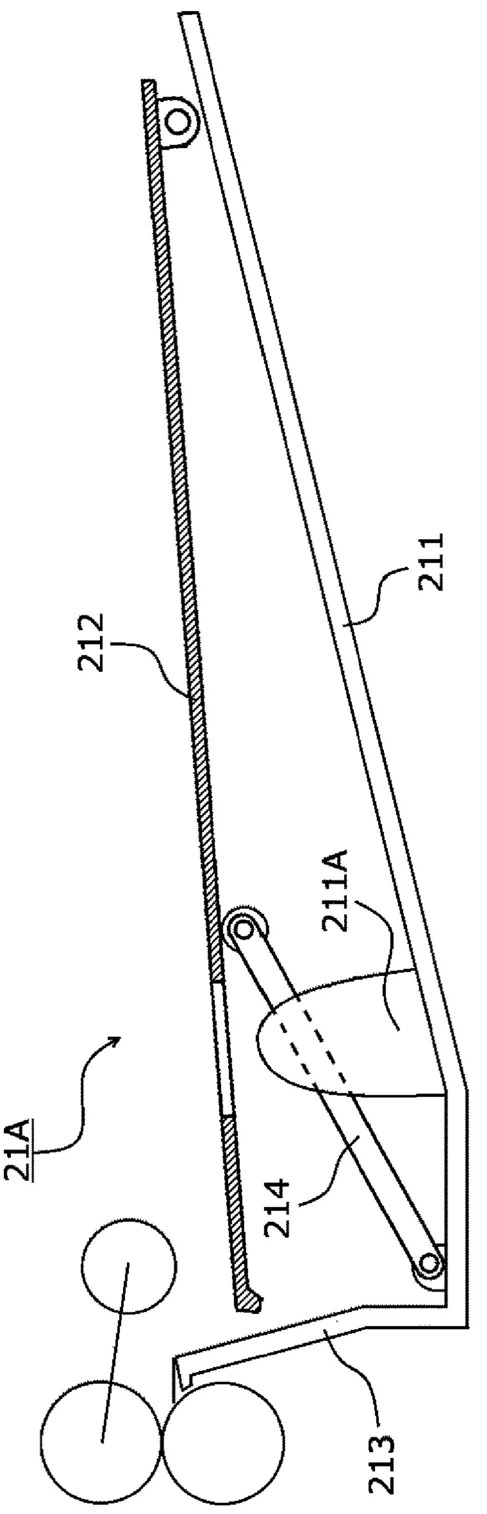
FIGS. 7A and 7B are cross-sectional views schematically illustrating the configuration of a sheet load section according to a first modification.
Figure 7B:
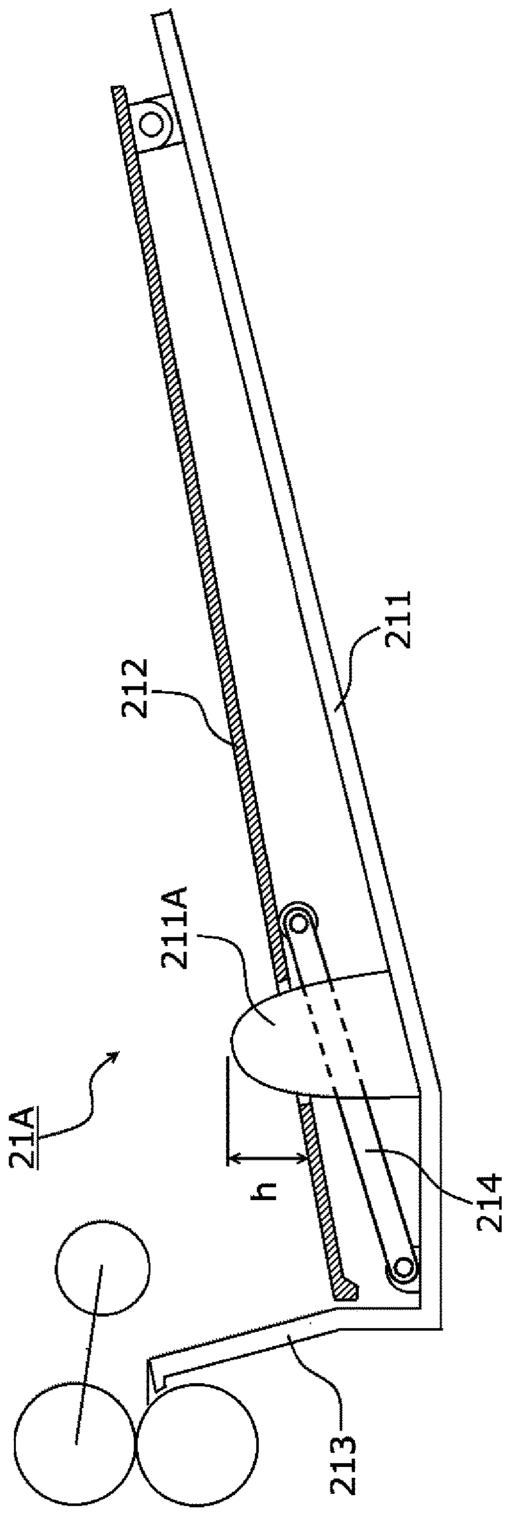
Figure 8:
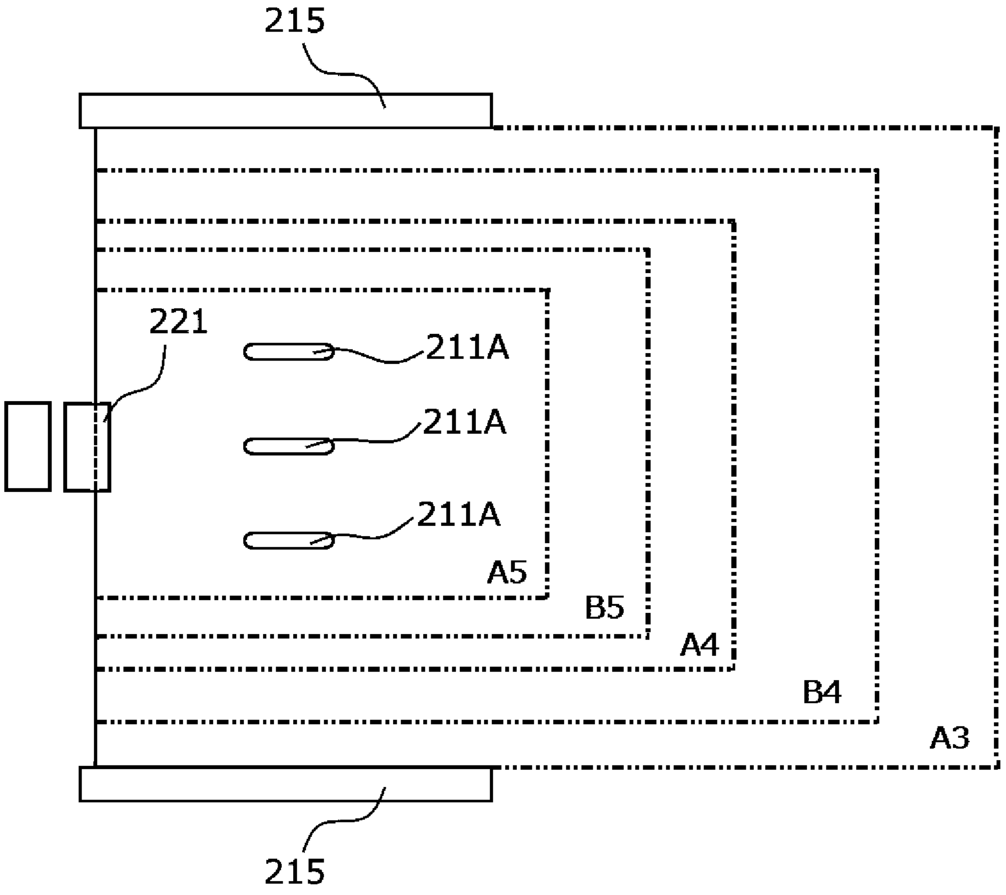
FIG. 8 is a plan view schematically illustrating the arrangement of protrusions in the sheet load section according to the first modification.
Figure 9A:
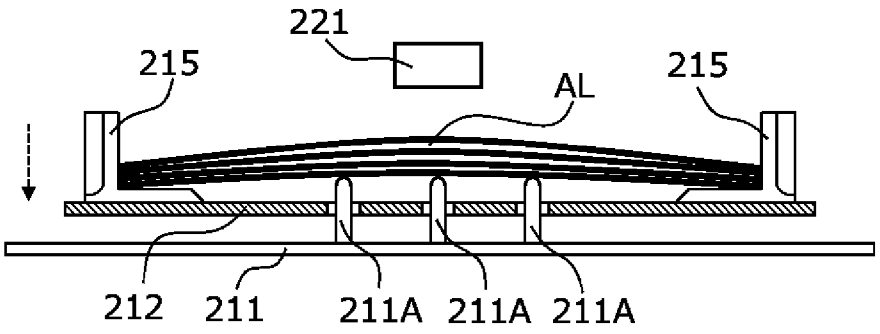
FIGS. 9A and 9B are cross-sectional views schematically illustrating the state of a sheet bundle placed on the ascendable-descendible plate.
Figure 9B:
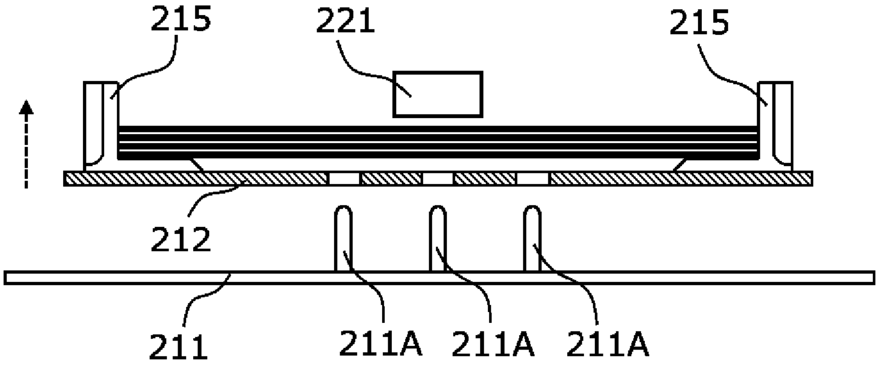

FIGS. 7A and 7B are cross-sectional views schematically illustrating the configuration of a sheet load section 21A according to a first modification. FIG. 8 is a plan view schematically illustrating the arrangement of protrusions 211A in the sheet load section 21A according to the first modification. FIGS. 9A and 9B schematically illustrate the state of a sheet bundle SB placed on the ascendable-descendible plate 212.

As shown in FIGS. 7A and 7B, the sheet load section 21A according to the first modification includes the protrusions 211A protruding toward the ascendable-descendible plate 212 from the upper surface of the tray body 211.

As shown in FIGS. 7A and 7B, the protruding height of each protrusion 211A is set such that the protrusion 211A does not protrude from the load surface 212*b* of the ascendable-descendible plate 212 (see FIG. 7A) in a state where the ascendable-descendible plate 212 having loaded thereon a maximum number of sheets S allowed to be loaded thereon has ascended to the sheet feed position, and protrudes from the load surface 212*b* of the ascendable-descendible plate 212 (see h in FIG. 7B) when the ascendable-descendible plate 212 descends to the descent position.

Furthermore, as schematically shown in FIG. 8, the protrusions 211A are multiple protrusions provided in the width direction intersecting the feeding direction of the sheets S, and are disposed in the central area in the width direction of the sheets S and come into contact with sheets S of the smallest transportable size allowed.

The protrusions 211A having this configuration are provided on the upper surface of the tray body 211 so that, in a case where the multiple sheets S are loaded as the sheet bundle SB on the load surface 212*b* of the ascendable-descendible plate 212, as shown in FIG. 9A, the protrusions 211A come into contact with the lowermost surface of the sheets S and cause the sheet bundle SB to bend when the ascendable-descendible plate 212 descends to the descent position. When the protrusions 211A come into contact with the sheet bundle SB from below and cause the sheet bundle SB to bend upward in a convex shape, air layers AL are formed between the sheets of the sheet bundle SB.

When the ascendable-descendible plate 212 descends to the descent position, the air layers AL are formed between the sheets in the sheet bundle SB constituted of a bundle of a large number of sheets S, so that the sheets S become readily movable toward the sheet-edge aligning section 213.

Furthermore, since the protrusions 211A are disposed in the central area in the width direction of the sheets S and come into contact with sheets S of the smallest transportable size allowed (e.g. size A5), air intervenes the sheet bundle SB of the smallest sheet size, whereby the sheets S become readily movable.

As shown in FIG. 9B, since the protrusions 211A are set at a height where they do not come into contact with the lowermost surface of the sheets S when the ascendable-descendible plate 212 having loaded thereon a maximum number of sheets S allowed to be loaded thereon has ascended to the feed position, the uppermost surface of the sheets S is prevented from bending during the feeding process of the sheets S.

Second Modification

Figure 10:
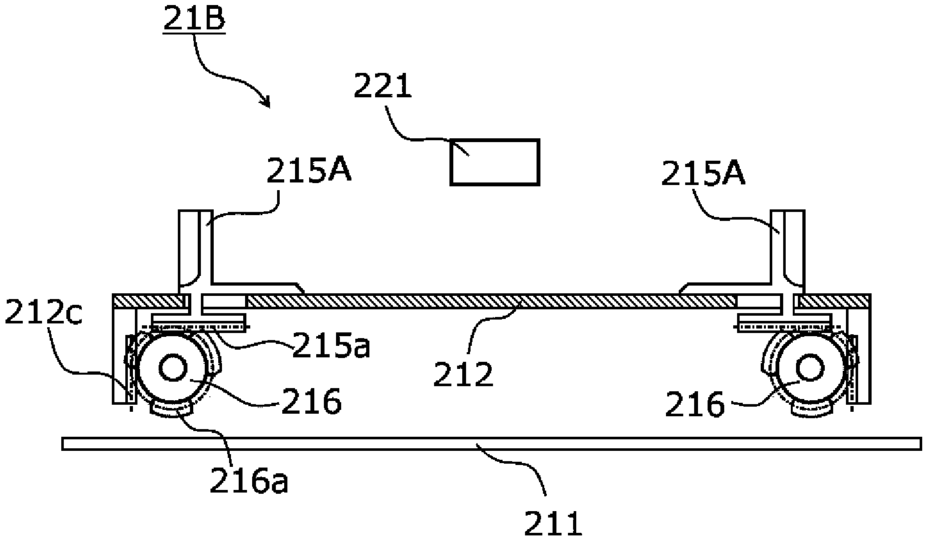
FIG. 10 is a cross-sectional view schematically illustrating the configuration of a sheet load section according to a second modification.
Figure 11A:
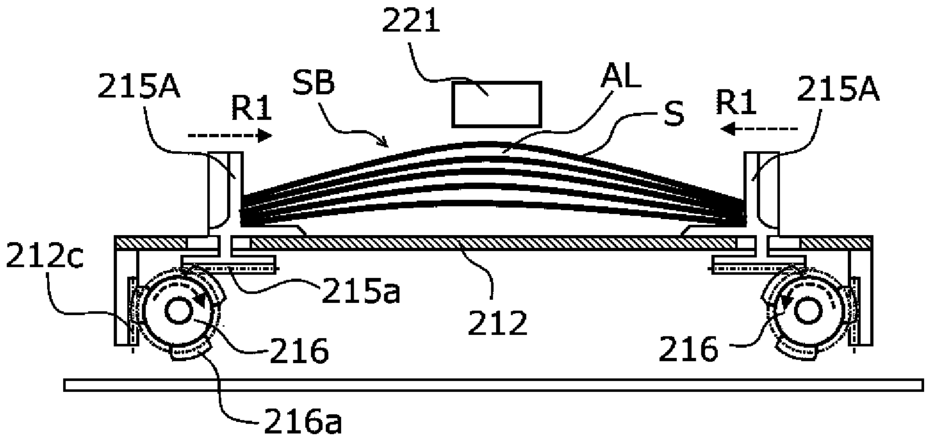
FIGS. 11A and 11B are cross-sectional views schematically illustrating the state of a sheet bundle placed on the ascendable-descendible plate.
Figure 11B:
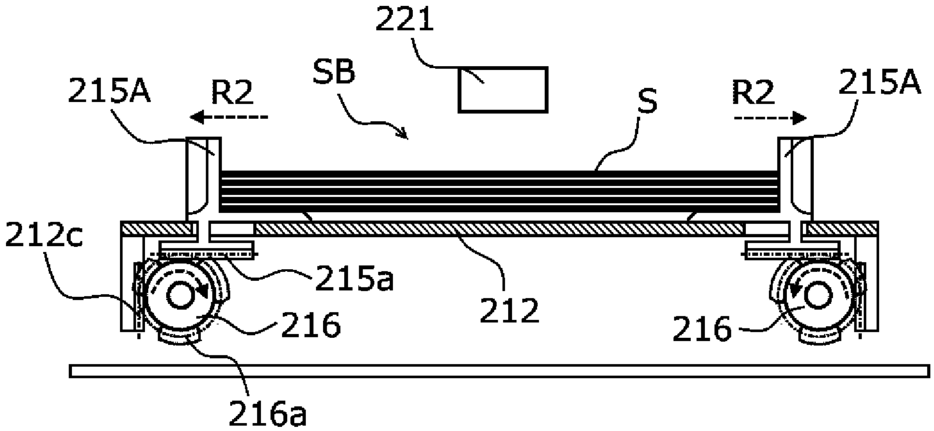

FIG. 10 is a cross-sectional view schematically illustrating the configuration of a sheet load section 21B according to a second modification. FIGS. 11A and 11B are cross-sectional views schematically illustrating the state of the sheet bundle SB placed on the ascendable-descendible plate 212.

The sheet load section 21B according to the second modification includes side guides 215A as an example of stoppers that cause the sheet bundle SB to bend by coming into contact with the lateral edges of the sheets S in the direction intersecting the feeding direction of the sheets S when the ascendable-descendible plate 212 ascends to the feed position.

As schematically shown in FIG. 10, the opposite lateral sides of the ascendable-descendible plate 212 are integrally provided with rack teeth 212*c* extending together with the ascendable-descendible plate 212 in the ascending-descending direction of the ascendable-descendible plate 212.

At the lower side of the ascendable-descendible plate 212, the side guides 215A integrally have rack teeth 215*a* with the ascendable-descendible plate 212 interposed therebetween. The rack teeth 215*a* extend together with the side guides 215A in the moving direction (i.e. the direction intersecting the sheet feeding direction) of the side guides 215A.

The tray body 211 rotatably supports missing-tooth gears 216. As shown in FIG. 10, the missing-tooth gears 216 according to this exemplary embodiment each have three teeth 216*a* at equal intervals in the circumferential direction, and any of the teeth 216*a* engages with the rack teeth 212*c* provided in the ascendable-descendible plate 212 and the rack teeth 215*a* provided in the side guides 215A.

In the sheet load section 21B having the above-described configuration, when the ascendable-descendible plate 212 ascends from the descent position to the feed position, the rack teeth 212*c* integrally provided on the ascendable-descendible plate 212 engage with the teeth 216*a* of the missing-tooth gears 216, so that the missing-tooth gears 216 rotate within the range in which the teeth 216*a* are provided as the ascendable-descendible plate 212 ascends. In this case, if the teeth 216*a* of the missing-tooth gears 216 have a chance to engage with the rack teeth 215*a* provided in the side guides 215A, the side guides 215A move in the width direction of the sheets S within the rotating range of the missing-tooth gears 216 (see an arrow R1 in FIG. 11A) so as to come into contact with the opposite edges of the sheet bundle SB, thereby causing the sheet bundle SB to bend.

When the side guides 215A that have moved to cause the sheet bundle SB to bend become disengaged from the rack teeth 215*a* with the rotation of the missing-tooth gears 216, the side guides 215A move in opposite directions from each other to increase the distance therebetween in accordance with the restoring force of the bent sheet bundle SB (see arrows R2 in FIG. 11B).

Because each missing-tooth gear 216 has three teeth 216*a* in the circumferential direction, the missing-tooth gear 216 performs intermittent rotation (see arrows in FIG. 11A) during the ascending of the ascendable-descendible plate 212. At the same time, the side guides 215A having the rack teeth 215*a* engaged with the missing-tooth gears 216 also move intermittently (see arrows R1 in FIG. 11A) so as to cause the sheet bundle SB to repeatedly bend.

Accordingly, as schematically shown in FIG. 11A, the sheets S may become readily movable owing to the air layers AL interposed between the sheets S. Specifically, when the ascendable-descendible plate 212 ascends from the descent position to the feed position, the air layers AL are repeatedly formed between the sheets in the sheet bundle SB constituted of a bundle of a large number of sheets S, so that the opposite widthwise edges of the sheet bundle SB are aligned and that the sheets S become readily movable toward the sheet-edge aligning section 213.

According to the sheet load section 21 according to this exemplary embodiment, the ascending-descending operation for moving the ascendable-descendible plate 212 between the sheet feed position and the descent position therebelow is performed at least once before the automatic sheet feeder 22 starts feeding the sheets S, so that a skew of the sheets S may be corrected before the sheets S loaded on the ascendable-descendible plate 212 are fed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet transport device comprising:

a sheet load tray on which a sheet is loaded;

a tray body that supports the sheet load tray from below, wherein the sheet load tray is rotatably fixed to the tray body;

a detector that detects whether or not the sheet exists on the sheet load tray;

a feeder that feeds the sheet one-by-one from the sheet load tray;

a sheet-load-tray ascend-descend unit that moves the sheet in a sheet loading direction to set an uppermost sheet at a sheet feed position of the feeder, wherein the sheet-load-tray ascend-descend unit comprises an ascend-descend rod that is configured to cause the sheet load tray to ascend and descend between the sheet feed position and a descent position located below the sheet feed position, and the ascend-descend rod is disposed between the sheet load tray and the tray body;

a controller, wherein in a case where the sheet is detected by the detector, the controller causes the sheet load tray to ascend or descend before the feeder starts to feed the sheet such that ascending-descending operation for moving the sheet load tray between the sheet feed position and the descent position is performed at least once; and a protrusion that comes into contact with a lowermost surface of a plurality of the sheets constituting a sheet bundle when the sheet load tray descends to the descent position, so as to cause the sheet bundle to bend.

2. The sheet transport device according to claim 1, wherein an input for selecting either one of a productivity priority mode and a correction priority mode is received, the productivity priority mode being a mode for prioritizing productivity by increasing the number of feedable sheets per unit time, the correction priority mode being a mode for prioritizing a skew correction process for correcting a skew of the sheet toward zero, and wherein the controller determines whether or not the ascending-descending operation of the sheet load tray is to be performed in accordance with the selected mode, and sets the number of times the ascending-descending operation is to be performed in accordance with the selected mode if the controller determines that the skew correction process is to be performed.

3. The sheet transport device according to claim 2, wherein the sheet load tray is inclined at the descent position to decrease in height toward a feeding direction of the sheet.

4. The sheet transport device according to claim 2, wherein the protrusion includes a plurality of protrusions that are disposed in a central area in a direction intersecting a feeding direction of the sheet and that come into contact with a sheet of a smallest transportable size allowed.

5. The sheet transport device according to claim 3, wherein the protrusion includes a plurality of protrusions that are disposed in a central area in a direction intersecting the feeding direction of the sheet and that come into contact with a sheet of a smallest transportable size allowed.

6. The sheet transport device according to claim 1, wherein the sheet load tray is inclined at the descent position to decrease in height toward a feeding direction of the sheet.

7. The sheet transport device according to claim 6, wherein the protrusion includes a plurality of protrusions that are disposed in a central area in a direction intersecting the feeding direction of the sheet and that come into contact with a sheet of a smallest transportable size allowed.

8. The sheet transport device according to claim 1, wherein the protrusion includes a plurality of protrusions that are disposed in a central area in a direction intersecting a feeding direction of the sheet and that come into contact with a sheet of a smallest transportable size allowed.

9. The sheet transport device according to claim 8, wherein the protrusion does not come into contact with the lowermost surface of the sheets when the sheet load tray having loaded thereon a maximum number of the sheets allowed to be loaded on the sheet load tray ascends to the sheet feed position.

10. The sheet transport device according to claim 1, wherein the protrusion does not come into contact with the lowermost surface of the sheets when the sheet load tray having loaded thereon a maximum number of the sheets allowed to be loaded on the sheet load tray ascends to the sheet feed position.

11. The sheet transport device according to claim 1, further comprising:

a stopper that comes into contact with lateral edges of the sheet in a direction intersecting a feeding direction of the sheet when the sheet load tray ascends to the sheet feed position, so as to cause the sheet bundle to bend.

12. An image reading device comprising:

an imaging unit that reads an image of a sheet; and the sheet transport device according to claim 1 that transports the sheet to a read position where the imaging unit reads the sheet.

13. An image forming apparatus comprising:

the image reading device according to claim 12 that reads an image of a sheet; and an image recorder that records the image read by the image reading device onto a recording medium.

14. A sheet transport device comprising:

a sheet load tray on which a sheet is loaded;

a detector that detects whether or not the sheet exists on the sheet load tray;

a feeder that feeds the sheet one-by-one from the sheet load tray;

a sheet-load-tray ascend-descend unit that moves the sheet in a sheet loading direction to set an uppermost sheet at a sheet feed position of the feeder;

a controller, wherein in a case where the sheet is detected by the detector, the controller causes the sheet load tray to ascend or descend before the feeder starts to feed the sheet such that ascending-descending operation for moving the sheet load tray between the sheet feed position and a descent position located below the sheet feed position is performed at least once; and a stopper that comes into contact with lateral edges of the sheet in a direction intersecting a feeding direction of the sheet when the sheet load tray ascends to the sheet feed position, so as to cause a sheet bundle to bend, wherein the stopper causes the sheet bundle to bend by repeatedly moving in the direction intersecting the feeding direction of the sheet via a missing-tooth gear that is rotationally driven in accordance with ascending of the sheet load tray.

* * * * *